United States Patent
Miyazaki

(10) Patent No.: US 8,103,148 B2
(45) Date of Patent: Jan. 24, 2012

(54) RECORDING APPARATUS AND RECORDING METHOD

(75) Inventor: Koji Miyazaki, Hamura (JP)

(73) Assignee: Kabushiki Kaisha Toshiba, Tokyo (JP)

( * ) Notice: Subject to any disclaimer, the term of this patent is extended or adjusted under 35 U.S.C. 154(b) by 1102 days.

(21) Appl. No.: 11/870,727

(22) Filed: Oct. 11, 2007

(65) Prior Publication Data

US 2008/0253747 A1 Oct. 16, 2008

(51) Int. Cl.
*H04N 9/80* (2006.01)
*H04N 5/77* (2006.01)

(52) U.S. Cl. ......... 386/248; 386/359; 386/361; 711/111

(58) Field of Classification Search .................. 386/200, 386/213, 230, 239, 358–362, 248; 369/53.1, 369/53.13, 84; 711/9, 10, 14, 111
See application file for complete search history.

(56) References Cited

U.S. PATENT DOCUMENTS

2005/0068878 A1* 3/2005 Itoh et al. ........................ 369/84

FOREIGN PATENT DOCUMENTS

| JP | 11112919 | 4/1994 |
|---|---|---|
| JP | 2001036786 | 2/2001 |
| JP | 2002369121 | 12/2002 |
| JP | 2004165706 | 6/2004 |
| JP | 2006191431 | 7/2006 |
| KR | 2005057723 | * 6/2005 |

* cited by examiner

*Primary Examiner* — Thai Tran
*Assistant Examiner* — Mishawn Dunn
(74) *Attorney, Agent, or Firm* — Pillsbury Winthrop Shaw Pittman, LLP

(57) ABSTRACT

A recording apparatus comprises: a removable recording medium; a processor; and a receiving unit that receives an operation command for demounting the removable recording medium, wherein, when the receiving unit receives the operation command, the processor demounts the removable recording medium from a file system; and wherein the processor automatically mounts the recording medium on the file system under a predetermined condition in which a command of mounting the recording medium is not given.

5 Claims, 9 Drawing Sheets

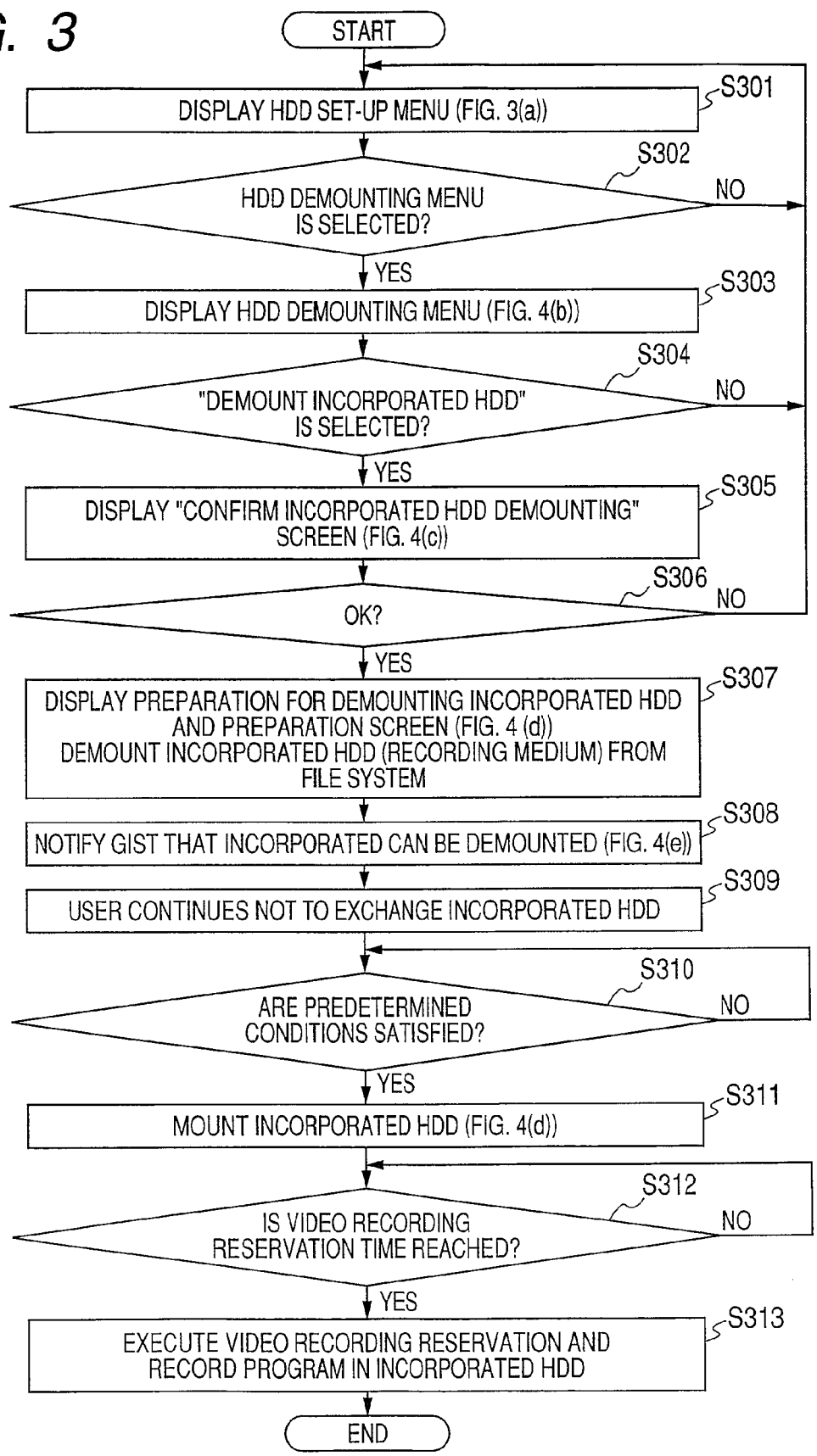

MESSAGE FLICKERS UNTIL PREPARATION FOR MOUNTING INCORPORATED HDD IS COMPLETED

RECORDING APPARATUS AND RECORDING METHOD

CROSS-REFERENCE TO RELATED APPLICATIONS

This application is based upon and claims the benefit of priority from Japanese Patent Application No. 2007-103663, filed Apr. 11, 2007, the entire contents of which are incorporated herein by reference.

BACKGROUND

1. Field

One embodiment of the invention relates to a recording apparatus, and more particularly, to a recording apparatus having a removable recording medium and a recording method.

2. Description of the Related Art

Some of digital TVs spread in recent years realizes a video recording function by mounting an HDD (Hard Disk Drive) thereon. Some products mounted with the HDD allows a user to mount and demount the HDD (for example, see Japanese Unexamined Patent Application Publication No. 2006-191431).

In the products having an HDD mounting and demounting function, a predetermined guidance is provided by a GUI (Graphical User Interface) in order to allow a user to operate the products, thereby safely mounting and demounting the HDD as a precise component. The presently attached HDD is first demounted to perform the HDD mounting and demounting function. In a receiver, the HDD is demounted from a file system when the user commands to demount the HDD, which is not mounted until the user commands to mount the HDD.

Even though a video recording reservation is set with the HDD demounted, the video recording reservation is inhibited. As a result, when the user forgets a command of mounting the HDD for any reason after the HDD is demounted by the user's demounting command with the intention of changing the HDD, the video recording reservation after the HDD is demounted is failed.

In the known recording apparatus, when a user forgets a command of mounting a recording medium for any reason after the recording medium is demounted by the user's demounting command with the intention of changing the recording medium, the recording reservation after the recording medium is demounted is failed.

BRIEF DESCRIPTION OF THE SEVERAL VIEWS OF THE DRAWINGS

A general architecture that implements the various feature of the invention will now be described with reference to the drawings. The drawings and the associated descriptions are provided to illustrate embodiments of the invention and not to limit the scope of the invention.

FIG. 3 is an exemplary flowchart illustrating an operation at the time of demounting an incorporated HDD 290.

DETAILED DESCRIPTION

Various embodiments according to the invention will be described hereinafter with reference to the accompanying drawings. In general, according to one embodiment of the invention, A recording apparatus comprises: a removable recording medium; a processor; and a receiving unit that receives an operation command for demounting the removable recording medium, wherein, when the receiving unit receives the operation command, the processor demounts the removable recording medium from a file system; and wherein the processor automatically mounts the recording medium on the file system under a predetermined condition in which a command of mounting the recording medium is not given.

Figure 1:
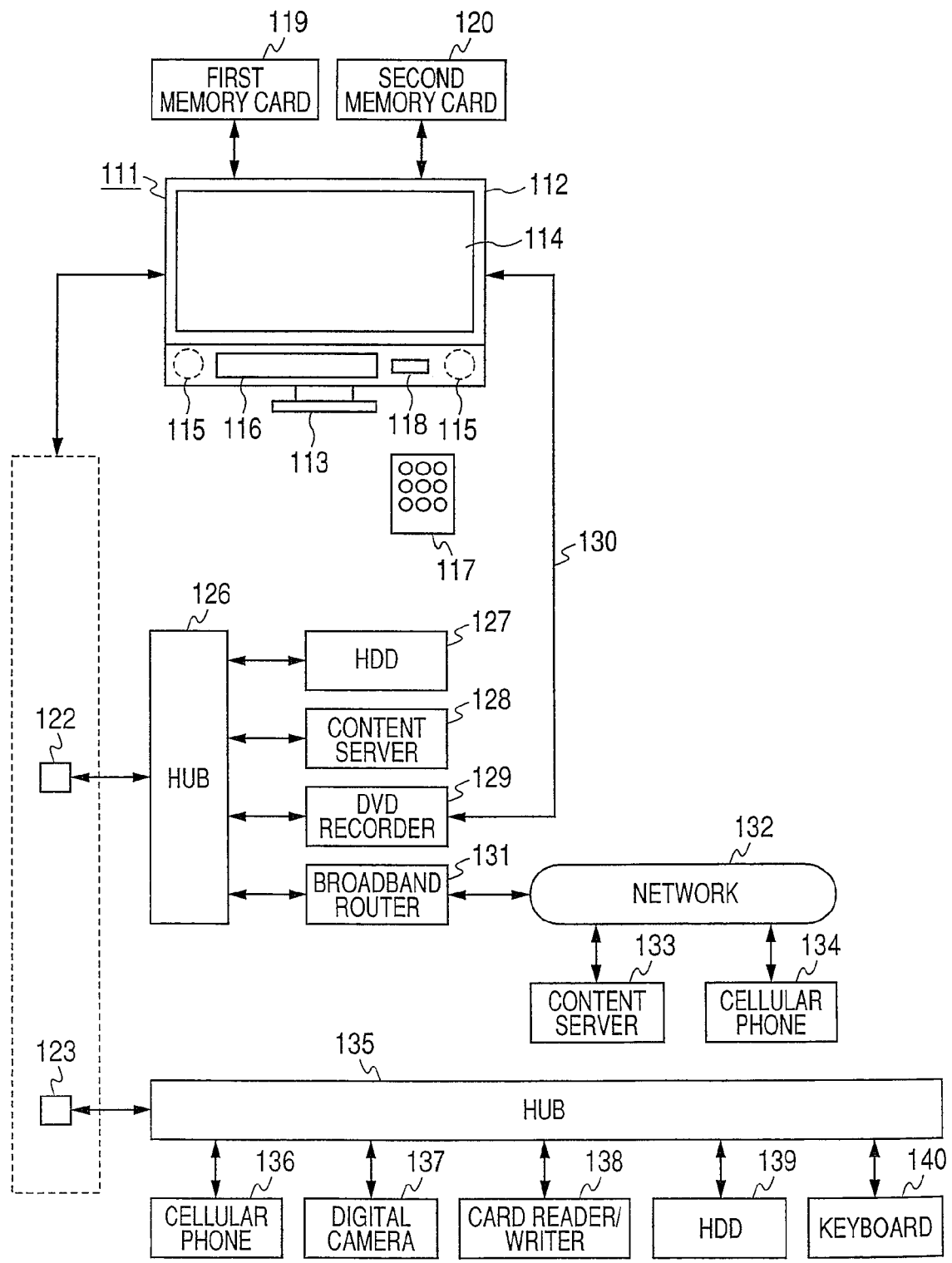
FIG. 1 is a diagram illustrating an appearance of a digital television broadcasting receiver 111 and a network system mainly constituted by the digital television broadcasting receiver 111.

Hereinafter, embodiments of the invention will be described with reference to the accompanying drawings. FIG. 1 is a schematic diagram showing an example of an appearance of a digital television broadcasting receiver 111 according to an embodiment of the invention and a network system mainly having the digital television broadcasting receiver 111.

That is, the digital television broadcasting receiver 111 mainly includes a slim cabinet 112 and a support 113 uprightly supporting the cabinet 112. A flat panel type video display 114 composed of an SE (Surface-conduction Electron-emitter Display) display panel and a liquid crystal display panel, a speaker 115, an operation unit 116, and a light receiving unit 118 receiving operation information transmitted from a remote controller 117 are installed in the cabinet 112.

A first memory card 119 including an SD (Secure Digital) memory card, an MMC (Multimedia Card), and a memory stick is attachable to and detachable from the digital television broadcasting receiver 111. Recording and reproducing operations of information including programs or photographs are performed with respect to the first memory card 119.

A second memory card (IC card) 120 having contract information, etc. recorded therein is attachable to and detachable from the digital television broadcasting receiver 111. The recording and reproducing operations of information are performed with respect to the second memory card 120.

The digital television broadcasting receiver 111 includes a first LAN (Local Area Network) terminal 121, a second LAN terminal 122, and a USB (Universal Serial Bus) terminal 123.

Among them, the first LAN terminal 121 is used as a LAN correspondence HDD-dedicated port and is used to record and reproduce the information with respect to a LAN correspondence HDD 125 which is an NAS (Network Attached Storage) connected thereto by the use of Ethernet (registered trademark)

As described above, the first LAN terminal 121 as the LAN correspondence HDD dedicated port is provided, and thus, the information on the program can be stably recorded in the HDD 125 in a high-vision image quality without being influenced by other network environments or network usage statuses.

The second LAN terminal 122 is used as a general LAN correspondence port using Ethernet (registered trademark). The second LAN terminal 122 is connected to apparatuses such as a LAN correspondence HDD 127, a content server 128, and a DVD (Digital Versatile Disk) recorder 129 with an incorporated HDD are connected to via a hub 126 and is used to transmit and receive the information to and from the apparatuses.

The content server 128 has a function for acting as a content server apparatus on a home network and includes an UPnP (Universal Plug and Play) correspondence apparatus providing URI (Uniform Resource Identifier) information required for access to contents.

Since digital information communicated via the second LAN terminal 122 is information only for a control system, it is necessary to provide a dedicated analog transmission channel 130 in the DVD recorder 129 in order to transmit and receive analog video and audio information to and from the digital television broadcasting receiver 111.

The second LAN terminal 122 is connected to a network 132 such as Internet via a broadband router 131 connected to the hub 126 and is used to transmit and receive the information to and from a content server 133 or a cellular phone 134 via the network 132.

The content server 133 has a function for acting as the content server apparatus and includes the UPnP (Universal Plug and Play) correspondence apparatus providing the URI information required for the access to the contents.

The USB terminal 123 is used as a general USB correspondence port. The USB terminal 123 is connected to USB apparatuses including a cellular phone 136, a digital camera 137, a card reader/writer 138 for a memory card, a HDD 139, and a keyboard 140 and is used to transmit and receive the information to and from the USB apparatuses.

Figure 2:
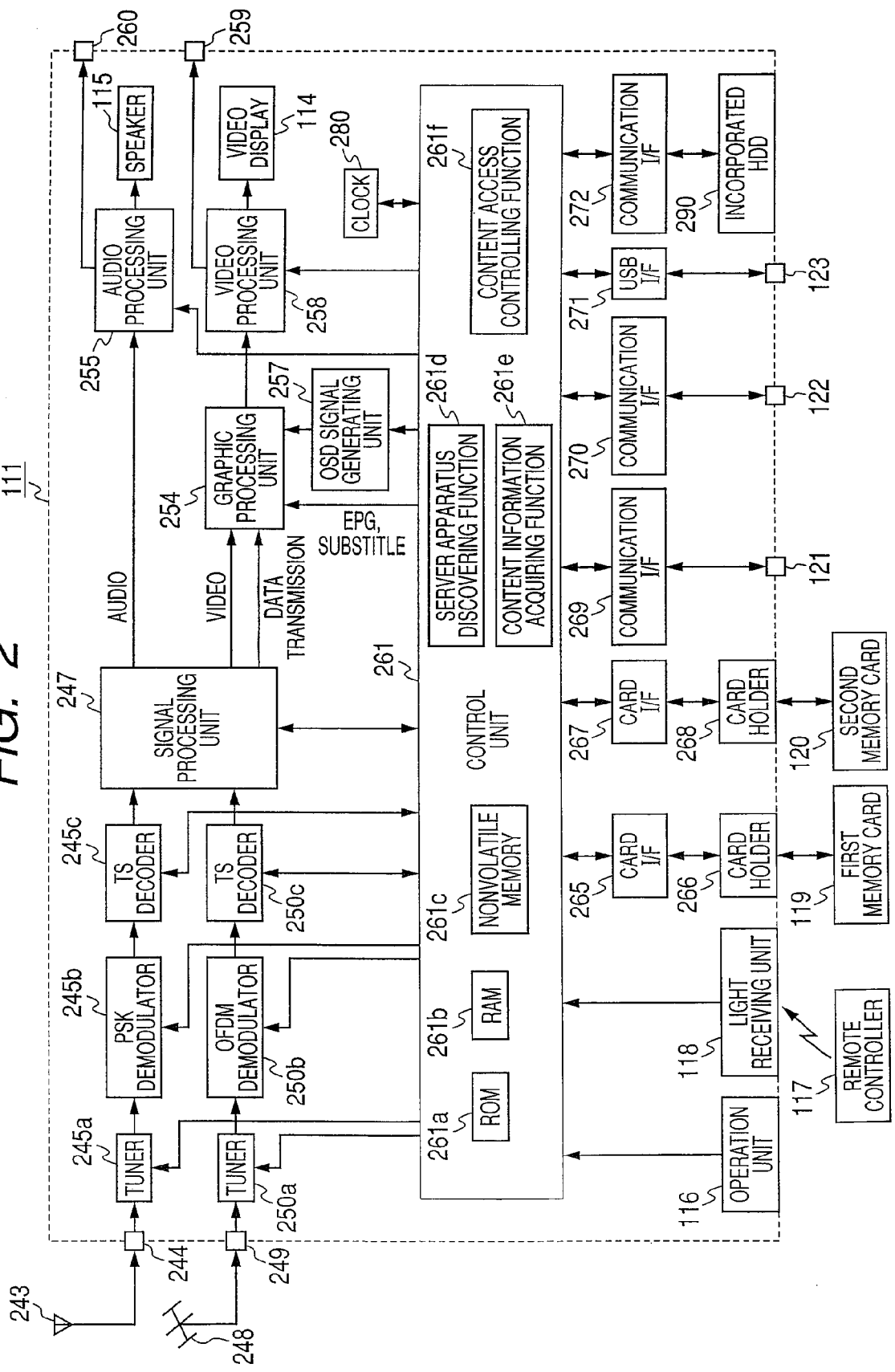
FIG. 2 is an exemplary diagram illustrating a main signal processing system of a digital television broadcasting receiver 111.

FIG. 2 shows a main signal processing system of the digital television broadcasting receiver 111.

That is, a satellite digital television broadcasting signal received by a BS/CS digital broadcasting receiving antenna 243 is supplied to a satellite digital broadcasting tuner 245*a* via an input terminal 244.

The tuner 245*a* tunes a broadcasting signal of a desired channel by a control signal received from a control unit 261 and outputs the tuned broadcasting signal to a PSK (Phase Shift Keying) demodulator 245*b*.

The PSK demodulator 245*b* demodulates the broadcasting signal tuned by the tuner 245*a* by the use of the control signal received from the control unit 261. The PSK demodulator 245*b* acquires a transport stream including a desired program and outputs it to a TS decoder 245*c*.

The TS decoder 245*c* TS-decodes a transport stream (TS) multiplexed signal and outputs a PES (Packetized Elementary Stream) acquired by depacketizing a digital video signal and a digital audio signal of the desired program to an STD buffer 247*f* of the signal processing unit 247.

The TS decoder 245*c* outputs section information being transmitted by digital broadcasting to a section processing portion 247*h* of the signal processing unit 247.

A terrestrial digital television broadcasting signal received by a terrestrial broadcasting receiving antenna 248 is supplied to a terrestrial digital broadcasting tuner 250*a* via an input terminal 249.

The tuner 250*a* tunes the broadcasting signal of the desired channel by the use of the control signal received from the control unit 261 and outputs the tuned broadcasting signal to an OFDM (Orthogonal Frequency Division Multiplexing) demodulator 250*b*.

The PSK demodulator 250*b* demodulates the broadcasting signal tuned by the tuner 250*a* by the use of the control signal received from the control unit 261. The PSK demodulator 250*b* acquires the transport stream including the desired program and outputs it to a TS decoder 250*c*.

The TS decoder 250*c* TS-decodes the transport stream (TS) multiplexed signal by the use of the control signal received from the control unit 261 and outputs the PES (Packetized Elementary Stream) acquired by depacketizing the digital video signal and the digital audio signal of the desired program to the STD buffer 247*f* of the signal processing unit 247.

The TS decoder 250*c* outputs the section information being transmitted by the digital broadcasting to the section processing portion 247*h* of the signal processing unit 247.

Here, the signal processing unit 247 selectively performs a predetermined digital signal process for the digital video signal and the digital audio signal supplied from the TS decoder 245*c* and the TS decoder 250*c* at the time of watching a television so as to output a graphic processing unit 254 and an audio processing unit 255. The signal processing unit 247 selects a contents reproducing signal of contents input from the control unit 261 and performs the predetermined digital signal process for the selected generation signal so as to output the contents reproducing signal to the graphic processing unit 254 and the audio processing unit 255 at the time of reproducing the contents.

Various data or electronic program guide (EPG) information, program attribute information (program genre, etc.), subtitle information (service information SI or PSI), etc. acquiring the program are input to the control unit 261 from the signal processing unit 247.

The control unit 261 performs an image generating process in order to display the EPG and the subtitle from the input information and outputs the generated image information to the graphic processing unit 254.

The section processing unit 247*h* outputs to the control unit 261 the various data or electronic program guide (EPG) information, program attribute information (program genre, etc.), subtitle information (service information SI or PSI), etc. acquiring the program among the section information input from the TS decoder 245*c* (250*c*).

The graphic processing unit 254 has a function of synthersizing (1) a digital video signal supplied from an AV decoder 247*g* of the signal processing unit 247, (2) an OSD signal generated by an OSD (On Screen Display) signal generating unit 257 or a GUI signal, (3) image data generated by data broadcasting, and (4) the EPG and the subtitle signal generated by the control unit 261 and outputting the synthesized signals to a video processing unit 258.

When the subtitle is displayed by subtitle broadcasting, the graphic processing unit 254 superimposes the subtitle information on the video signal on the basis of the subtitle information generated by the control of the control unit 261.

The digital video signal output from the graphic processing unit 254 is supplied to the video processing unit 258. The video processing unit 258 converts the input digital video signal into an analog video signal having a format, which is displayable by the video display 114 and outputs the analog video signal to the video display 114 so as to display the analog video signal and derive the analog video signal to the outside via an output terminal 259.

The audio processing unit 255 converts the input digital audio signal into an analog audio signal having a format, which can be generated by the speaker 115 and outputs the analog audio signal to the speaker 115 so as to reproduce the analog audio signal and derive the analog audio signal to the outside via an output terminal 260.

Here, in the digital television broadcasting receiver 111, almost all operations including the various receiving operations are collectively controlled by the control unit 261. The control unit 261 incorporates a CPU (Central Processing Unit), and the like. The control unit 261 receives the operation information from the operation unit 116, receives the operation information transmitted from the remote controller 117 via the light receiving unit 118, and controls the units so as to reflect the operation information.

In this case, the control unit 261 uses a ROM (Read Only Memory) 261a storing a control program executed by the CPU, a RAM (Random Access Memory) 261b providing the CPU with a working area, and a nonvolatile memory 261c storing various set-up information and control information.

The control unit 261 is connected to a card holder 266 on which a first memory card 119 can be mounted via a card I/F (Interface) 265. According to this configuration, the control unit 261 can transmit and receive the information to and from the first memory card 119 mounted on the card holder 266 via the card I/F 265.

The control unit 261 is connected to a card holder 268 on which a second memory card 120 can be mounted via a card I/F 267. According to this configuration, the control unit 261 can transmit and receive the information to and from the second memory card 120 mounted on the card holder 268 via the card I/F 267.

The control unit 261 is connected to the first LAN terminal 121 via a communication I/F 269. According to this configuration, the control unit 261 can transmit and receive the information to and from the LAN correspondence HDD 125 connected to the first LAN terminal 121 via a communication I/F 269. In this case, the control unit 261 serves as a DHCP (Dynamic Host Configuration Protocol) server, and allocates an IP (Internet Protocol) address to the LAN correspondence HDD 125 connected to the first LAN terminal 121 so as to control the LAN correspondence HDD 125.

The control unit 261 is connected to the second LAN terminal 122 via a communication I/F 270. According to this configuration, the control unit 261 can transmit and receive the information to and from the apparatuses (see FIG. 1) connected to the second LAN terminal 122 via the communication I/F 270.

The control unit 261 is connected to the USB terminal 123 via a USB I/F 271. According to this configuration, the control unit 261 can transmit and receive the information to and from the apparatuses (see FIG. 1) connected to the USB terminal 123 via the USB I/F 271.

The control unit 261 is connected to an incorporated HDD 290 via a communication I/F 272. According to this configuration, the control unit 261 can transmit and receive the information to and from the incorporated HDD 290.

The communication I/F 272 employs a USB connection, a connection according to an IDE (Integrated Drive Electronics) (ATA) standard, and a connection according to a Serial ATA standard extending the Serial ATA standard.

A broadcasted program can be recorded in the incorporated HDD 290. A format of data recorded in the incorporated HDD 290 may be a TS (Transport Stream) format or a format of analog broadcasting encoding data.

However, in the embodiment, the HDD 125 stores a registration file in which a storage ID (including an IP address and an apparatus name) allocated to each of the HDD 125, the HDD 127, the content server 128, and the DVD recorder 129 are described at the time of initial registration.

The nonvolatile memory 261c stores the storage ID of each of the HDD 125, the HDD 127, the content server 128, and the DVD recorder 129.

The control unit 261 has (1) a server apparatus discovering function 261d using a UPnP, (2) a content information acquiring function 261e using the UPnP, and (3) a content access controlling function 261f as functions according to the invention.

(1) In the control unit 261, the server apparatus discovering function 261d discovers a UPnP correspondence apparatus on the network by the use of a discovery function of the UPnP. For example, the server apparatus discovering function 261d discovers the content server 128 by the use of the discovery function of the UPnP.

(2) In the control unit 261, the content information acquiring function 261e controls the UPnP correspondence apparatus by the use of a control function of the UPnP and acquires the URI information required for the access to contents of the UPnP correspondence apparatus. For example, the content information acquiring function 261e controls the content server 128 and acquires the URI information required for the access to the contents stored in a HDD of the content server 128 from the content server 128.

(3) In the control unit 261, the content access controlling function 261f judges whether or not to access to the contents on the basis of IP address information of the server apparatus acquired by the server apparatus discovering function 261d, IP address information from the URI information acquired by the content information acquiring function 261e, and an IP address and a netmask which are allocated to the LAN terminal 122 of the digital television broadcasting receiver 111. The control unit 261 causes the video display 114 to display by the OSD a fact that the access to the contents is permitted in a case of judging that the access is valid and the access to the contents is not permitted in a case of judging that the access is invalid.

Next, an operation of demounting the HDD 290 incorporated in the digital television broadcasting receiver 111 configured as above will be specifically described with reference to FIG. 3.

FIG. 3 is a flowchart illustrating the operation of demounting the incorporated HDD 290.

Step S301: In FIG. 3, when the user commands for displaying a "Set up HDD" menu by operating a switch of the remote controller 117, the control unit 261 sends a command of displaying a GUI screen shown in FIG. 3(a) to the OSD (On Screen Display) signal generating unit 257. The GUI screen generated by the OSD (On Screen Display) signal generating unit 257 is multiplexed by the graphic processing unit 254 and the GUI screen of the "Set up HDD" menu shown in FIG. 3(a) is displayed on the video display 114.

Figure 4A:
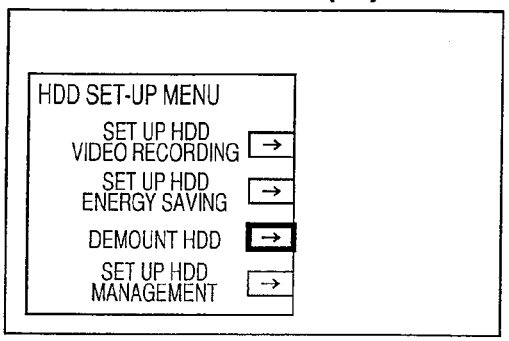
FIG. 4 is an exemplary diagram showing a GUI screen.
Figure 4E:
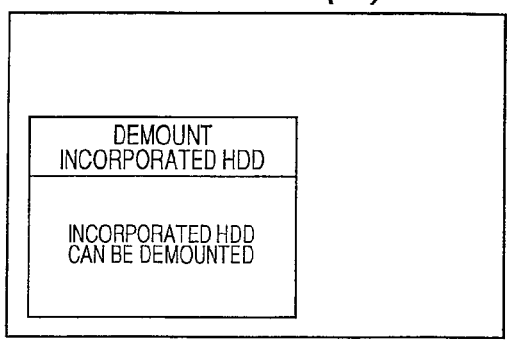

Step S302: When the user selects an item of "Demount HDD" in the "Set up HDD" menu shown in FIG. 4(a) by operating the remote controller 117 (Yes in Step S302), the process proceeds to Step S303 and when the user pushes a "Return" button of the remote controller 117 (No in Step S302), the process returns to Step S301.

Figure 4B:
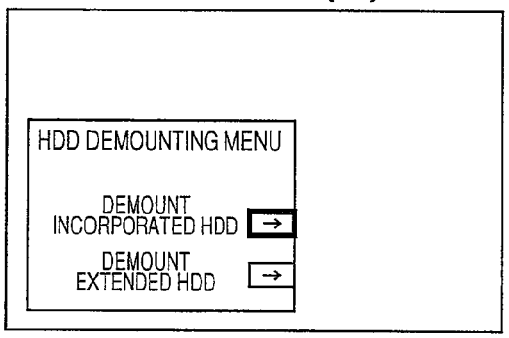
Figure 4F:
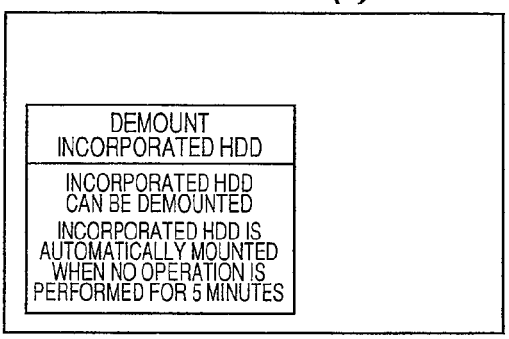
Figure 4C:
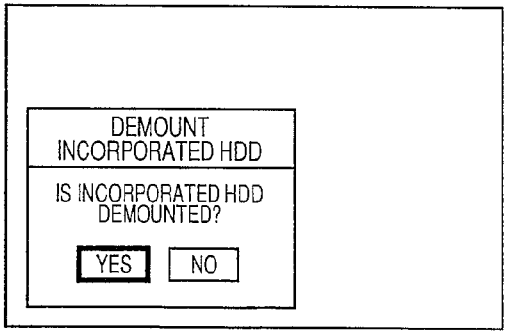
Figure 4G:
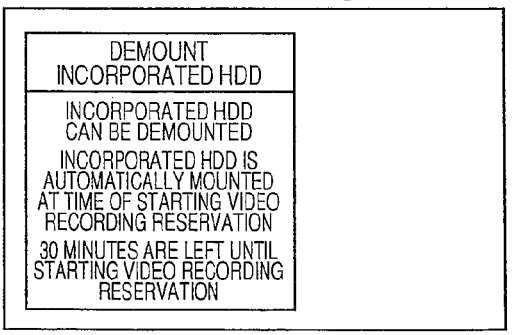
Figure 4D:
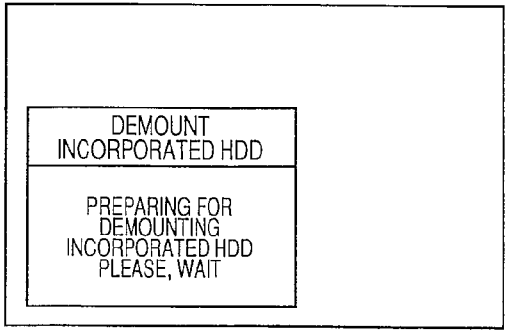

Step S303: The "Demount HDD" menu (shown in FIG. 4(b)) is displayed.

Step S304: When the user selects item "Demount incorporated HDD" in the menu of "Demount incorporated HDD" shown in FIG. 4(b) by operating the remote controller 117 (Yes in Step S304), the process proceeds to Step S305, when the user selects the item "Demount external HDD", the process proceeds to a menu of "Demount external HDD" (not shown), and when the user the user pushes the button "Return" of the remote controller 117 (No in Step S304), the process returns to Step S301.

Step S305: A screen of "Confirm Incorporated HDD Demounting" (shown in FIG. 4(*c*)) is displayed.

Step S306: When the user selects "OK" indicating the confirmation on the confirmation screen shown in FIG. 4(*c*) by operating the remote controller 117 (Yes in Step S306), the process proceeds to Step S307 and when the user pushes the "Return" button of the remote controller 117 (No in Step S306), the process returns to Step S301.

Step S307: The control unit 261 prepares for demounting the incorporated HDD and displays a screen (shown in FIG. 4(*d*)) exhibiting the demounting preparation. The preparation for demounting the incorporated HDD represents a process of demounting the incorporated HDD from the file system.

Step S308: When the preparation for demounting the incorporated HDD is ended, the preparation is ended and then, the control unit 261 displays a screen (FIG. 4(*e*)) for notifying a gist that the incorporated HDD can be demounted. A user's reproduction command is limited by displaying a message representing a fact that the user's reproduction command cannot be operated on a GUI.

Step S309: Here, the user continues not to exchange the incorporated HDD. In other words, an HDD unit 30 described with reference to FIG. 5 or drawings remains unexchanged.

Step S310: The control unit 261 allows the user to use a function of the HDD by automatically mounting the HDD when predetermined conditions are satisfied with the incorporated HDD unexchanged.

Examples of the predetermined conditions include:

(1) a time point when a sub-power source of the digital television broadcasting receiver 111 for performing only a timer recording operation at the back is turned off without watching the TV;

(2) a time point when the video display 114 is turned off (a time point when the video display 114 is turned off by the user or a time point when the video display 114 is automatically turned off to prevent screen image sticking or to save energy;

(3) a time point when a predetermined time (for example, 5 minutes) elapses after the HDD is demounted;

(4) a time point of a predetermined time, for example, 5 minutes, before the video recording reservation;

(5) a time point when the nonoperation lasts for a predetermined time; and (6) when the user performs an operation using the function of the HDD (for example, the reproduction operation).

Step S311: mount the incorporated HDD.

Step S312: perform the process of Step S313 when the time for the video recording reservation is reached.

Step S313: execute the video recording reservation and record a program, in which the video recording reservation is set, in the incorporated HDD.

As described above, in a recording apparatus having a recording function on an exchangeable recording medium according to the invention, even when the user forgets a permission command of access to the recording medium for any reason after the access to the recording medium is inhibited by a user's demounting command with the intention of changing the recording medium, the access to the recording medium is automatically permitted under a predetermined condition. Accordingly, the recording apparatus can normally perform a video recording reservation even after the access to the recording medium is inhibited.

Although the predetermined conditions are used in Modified Examples described below, it is possible to acquire the advantage of the invention and to acquire an additional advantage.

MODIFIED EXAMPLE 1

When the predetermined condition is (5) the time when the nonoperation lasts for the given time, FIG. 4(*f*) is displayed instead of FIG. 4(*e*) in Step S308. According to this configuration, the user can know how much time the user can exchange the HDD within.

MODIFIED EXAMPLE 2

When the predetermined condition is the time point (4) of the predetermined time before the video recording reservation, FIG. 4(*g*) is displayed instead of FIG. 4(*e*) in Step S308. According to this configuration, the user can know how much time the user can exchange the HDD within. The user can judge that it is preferable to exchange the HDD after the video recording reservation is ended.

Next, a configuration of the HDD according to the invention is specifically described with reference to FIGS. 5 to 10.

Figure 5:
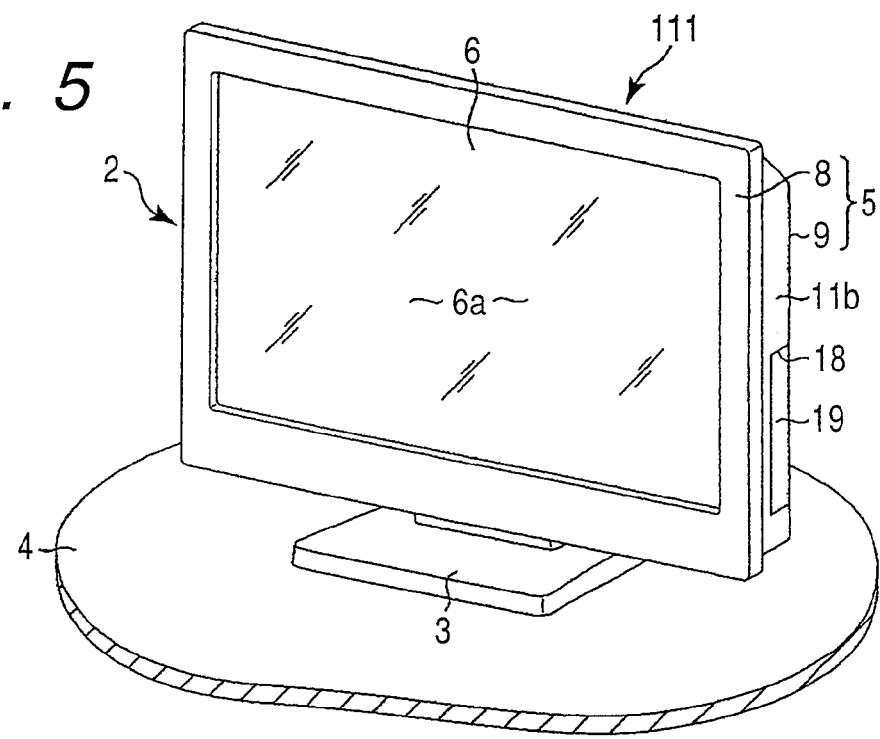
FIG. 5 is an exemplary perspective view of a digital television broadcasting receiver 111.

FIG. 5 shows the slim digital television broadcasting receiver 111 which is an example of a display apparatus. The digital television broadcasting receiver 111 has a flat display body 2. The display body 2 is placed above a TV table 4 via a stand 3. The display body 2 is not limited to being placed above the TV table 4. The display body 2 may be hung on an erected indoor wall surface by the use of, for example, a wall hanging bracket (not shown).

The display body 2 includes a synthetic-resin case 5 and a flat liquid crystal display panel 6 housed inside the case 5. The liquid crystal display panel 6 has a display screen 6*a* and a backlight (not shown) lighting the display screen 6*a*. The display screen 6*a* is exposed on a front surface of the case 5.

Figure 6:
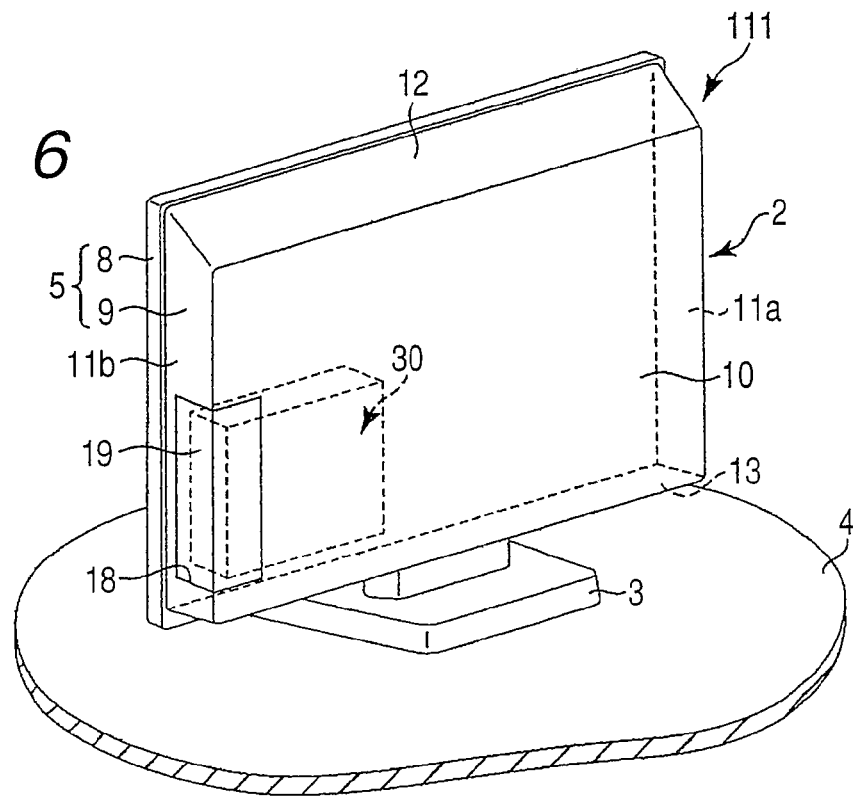
FIG. 6 is an exemplary perspective view of a digital television broadcasting receiver 111 as viewed from behind.

As shown in FIGS. 5 and 6, the case 5 includes a front cover 8 and a back cover 9. The front cover 8 surrounds the liquid crystal display panel 6. The back cover 9 is supported by the stand 3. The back cover 9 covers the liquid crystal display panel 6 from behind.

The back cover 9 has a rear wall 10, right and left sidewalls 11*a* and 11*b*, a top wall 12, and a bottom wall 13. The back cover 9 has a flat box shape opened toward the front of the case 5. The rear wall 10 is erected behind the liquid display panel 4. The right and left sidewalls 11*a* and 11*b* protrude toward the front of the case 5 from lateral edges of the rear wall 10. The top wall 12 and the bottom wall 13 protrude toward the front of the case 5 from an upper edge and a lower edge of the rear wall 10, respectively.

Figure 7:
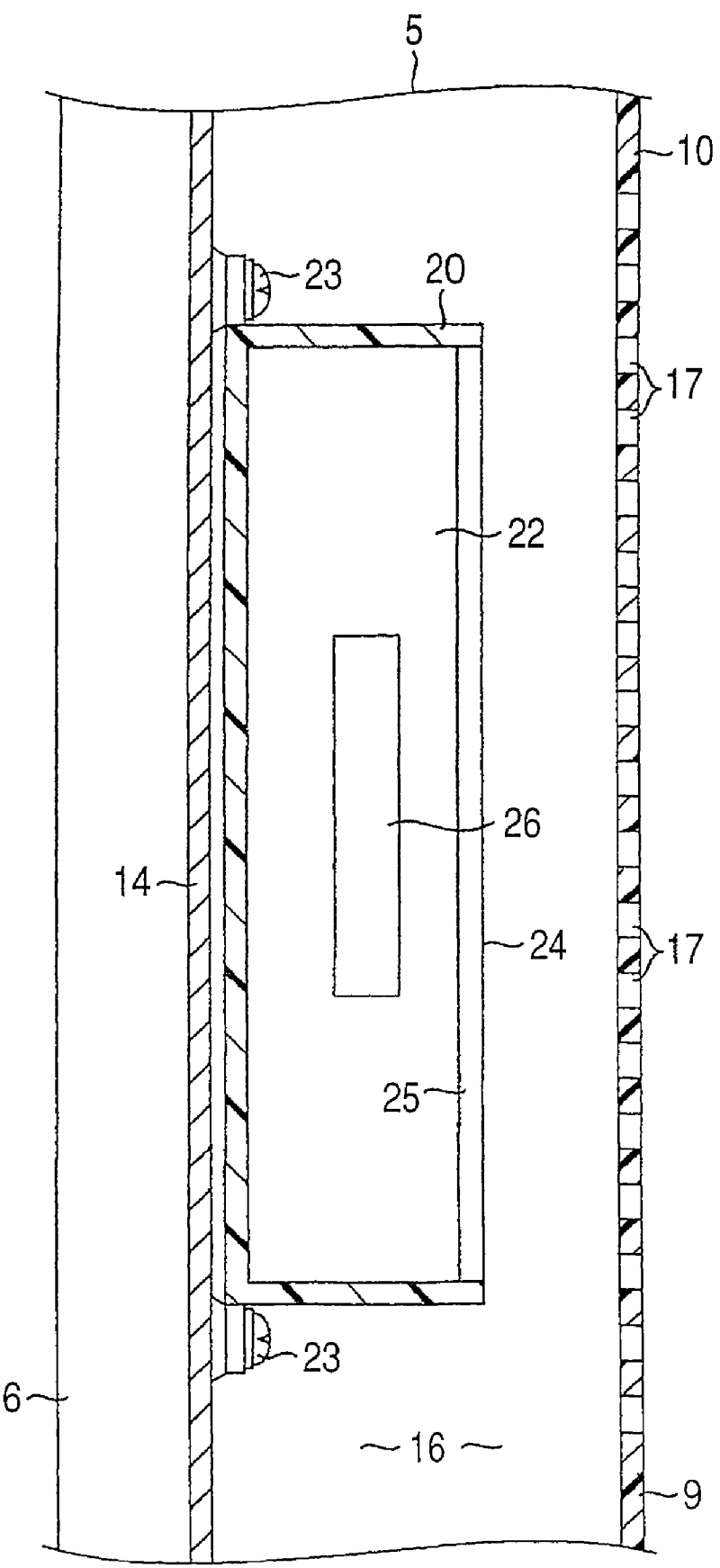
FIG. 7 is an exemplary cross-sectional view showing a state in which an HDD holder is fixed to a chassis.

As shown in FIG. 7, a metallic chassis 14 supporting the liquid crystal display panel 6 is housed inside the case 5. The chassis 14 is superimposed on a back surface of the liquid crystal display panel 6 and is opposed to the rear wall 10 of the back cover 9.

A housing chamber 16 is formed inside the back cover 9. The housing chamber 16 is located behind the chassis 14 and is connected to the outside of the case 5 via a plurality of ventilation holes 17 formed in the back cover 9.

As shown in FIGS. 5 and 6, an insertion portion 18 is formed in a corner defined by the rear wall 10 and the right sidewall 11*b* of the back cover 9. The insertion hole 18 is opened in the housing chamber 16. The insertion hole 18 has a vertically long opening shape in a height direction of the back cover 9. The insertion hole 18 can be opened and closed by a lid 19.

Figure 8:
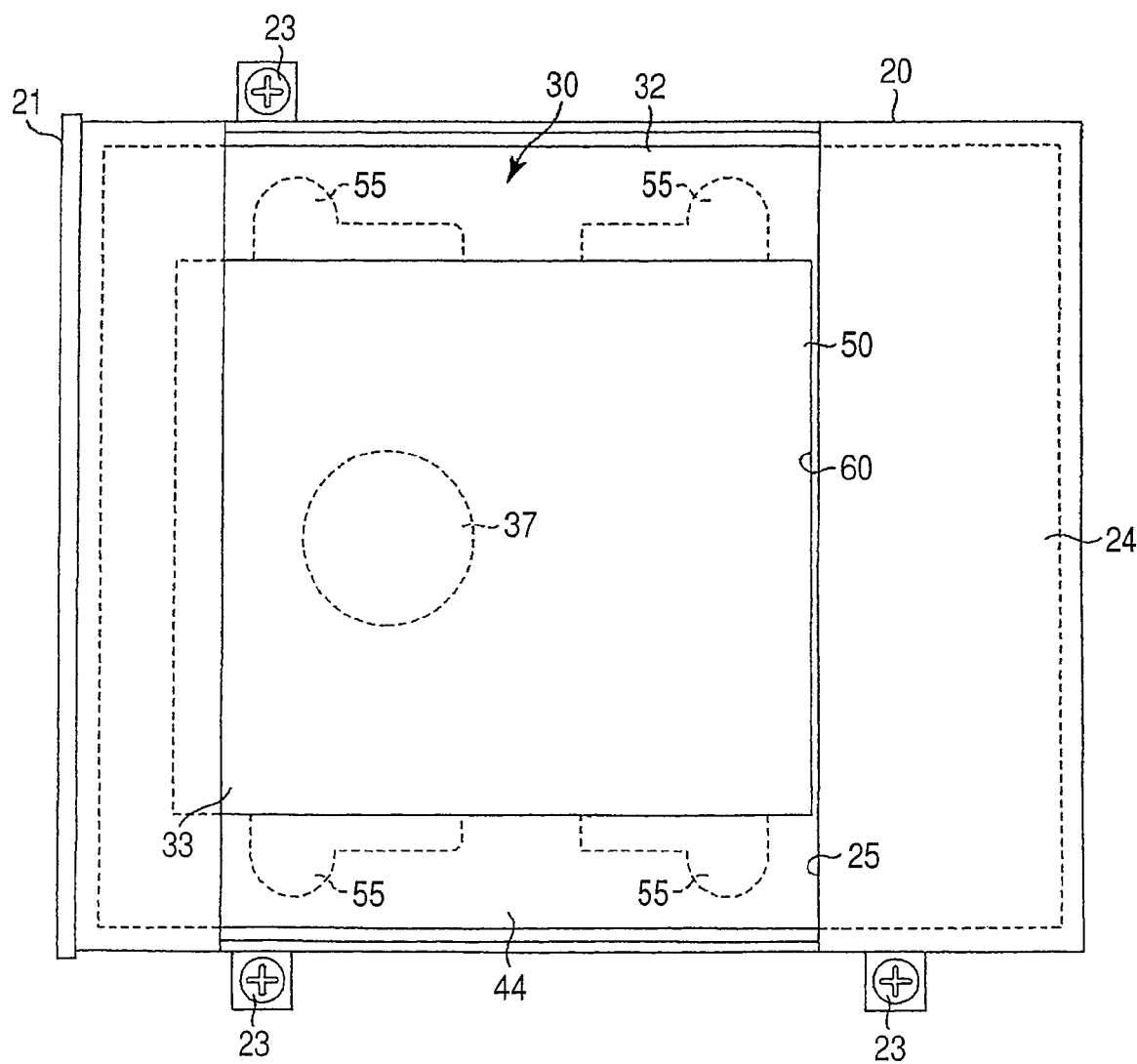
FIG. 8 is an exemplary front view showing a state in which an HDD unit is inserted into an HDD holder.
Figure 9:
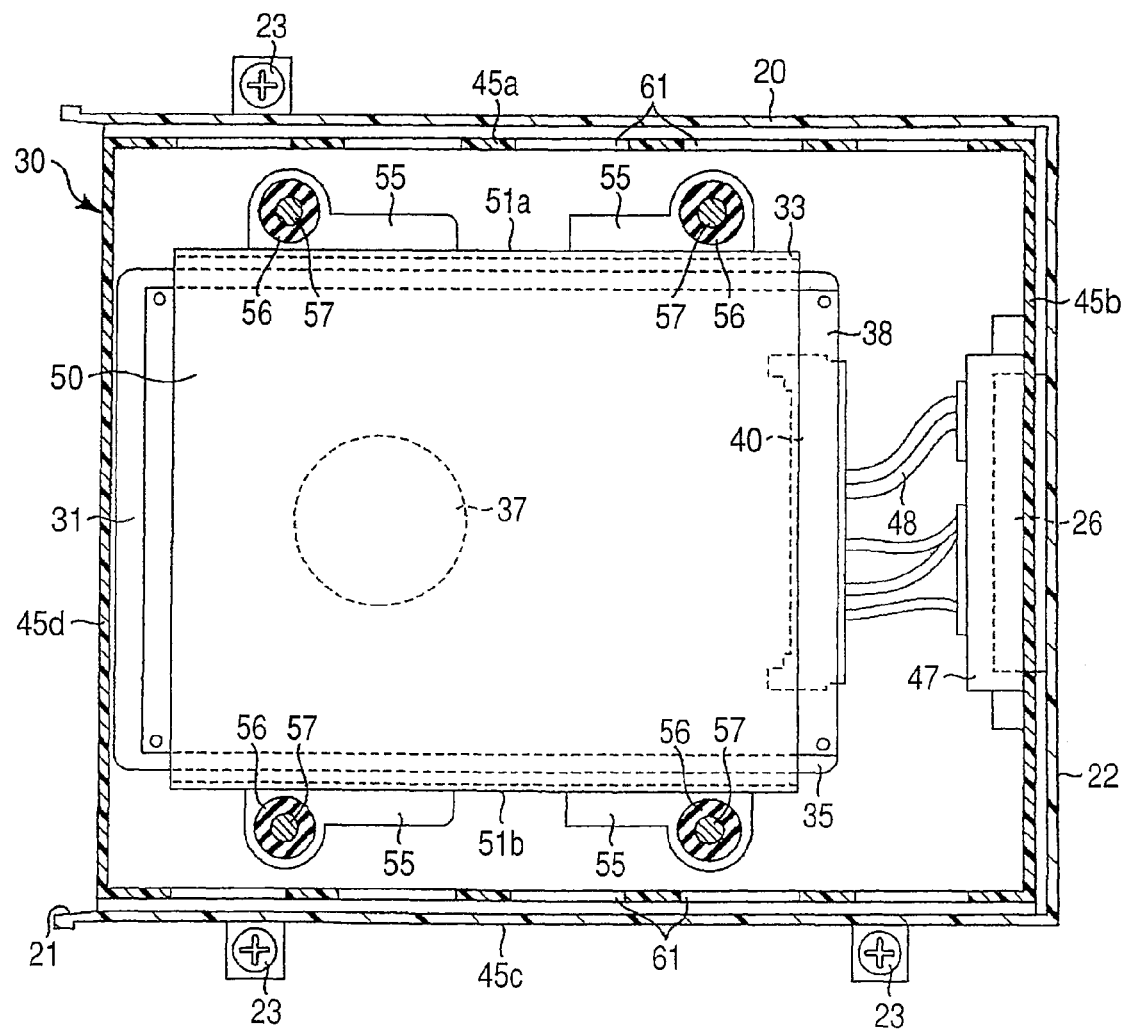
FIG. 9 is an exemplary cross-sectional view showing a state in which an HDD unit is inserted into an HDD holder.

As shown in FIGS. 7 to 9, a synthetic-resin HDD holder 20 is installed in the housing chamber 16 of the case. 5. The HDD holder 20 has a flat box shape. The HDD holder 20 has a mounting hole 21 and a connector supporting wall 22. The mounting hole 21 is located at a right end of the HDD holder 20. The mounting hole 21 has the vertically long opening shape in the height direction of the case 5. The connector supporting wall 22 is located at a left end of the HDD holder 20 so as to face the mounting hole 21.

The HDD holder 20 is fixed onto a back surface of the chassis 4 by the use of a plurality of screws 23. The mounting hole 21 of the HDD holder 20 faces the insertion hole 18 of the back cover 9 by the fixation.

The HDD holder 20 has a rear end wall 24 located opposite the chassis 14. The rear end wall 24 faces the rear wall 10 of the back cover 9. A rectangular window portion 25 which is notched so as to be opened in the housing chamber 16 is formed in the central part of the rear end wall 24.

A relay connector 26 is attached to the connector supporting wall 22 of the HDD holder 20. The relay connector 26 is electrically connected to the control unit 261 of the digital television broadcasting receiver 111 via the communication I/F 272 by the use of cables (not shown).

As shown in FIG. 9, the HDD holder 20 removably supports an HDD unit 30. The HDD unit 30 records a desired program or searches the recorded program quickly so as to reproduce the program. The HDD unit 30 is inserted into the mounting hole 21 of the HDD holder 20 from the insertion hole 18 of the back cover 9 so as to be movable in and out of the mounting hole 21. The HDD unit 30 is held in the housing chamber 16 of the case 5 by the use of the HDD holder 20.

As shown in FIG. 9, the HDD unit 30 has an HDD 31 (incorporated HDD 290 shown in FIG. 2), a synthetic-resin case 32 housing the HDD 31, and a bracket 33 holding the HDD 30 inside the case 32.

The HDD 31 has a metallic body 34. The metallic body 34 includes a base 35 and a top cover 36 fixed to the base 35. A clean enclosed space is formed between the top cover 36 and the base 35. Various constituent components such as a plurality of magnetic disks, a carriage having a magnetic head, and a spindle motor 37 driving the magnetic disks are housed in the clean enclosed space. An end of the spindle motor 37 is exposed outside the body 34 from a bottom of the base 35.

A print circuit board 38 is attached to the bottom of the base 35. The print circuit board 38 takes charge of controlling the HDD 31. A plurality of circuit components 39 such as IC chips and a first HDD connector 40 are mounted on the print circuit board 38. The print circuit board 38 faces the bottom of the base 35. The print circuit board 38 is exposed outside the body 34.

The spindle motor 37 and the circuit components 39 generate a heat at the time of operation of the HDD 31. As a result, the spindle motor 37 and the circuit components 39 serve as heat generating units of the HDD 31. The heat generated from the spindle motor 37 and the circuit components 39 is transferred to the print circuit board 38 or the body 34 of the HDD 31.

The case 32 housing the HDD 31 includes a case body 42 and a cover 43. The case body 42 has a flat box shape even larger than the HDD 31.

The case body 42 has a rectangular bottom wall 44, and four peripheral walls 45a, 45b, 45c, and 43d erected from a peripheral edge of the bottom wall 44. Edges of the peripheral walls 45a, 43b, 43c, and 43d define a rectangular opening 46. The opening 46 for leading the HDD 31 to the inside of the case body 42 faces the bottom wall 44

When the HDD unit 30 is inserted into the HbD holder 20, the one peripheral wall 45b of the case body 42 is located at a front end in the insertion direction. A second HDD connector 47 is attached onto the peripheral wall 45b. The second HDD connector 47 is electrically connected to the first HDD connector 40 via relay cables 48 and is fitted in the relay connector 26 of the HDD holder 20.

The cover 43 is attached to the case body 42 so as to close the opening 46. The cover 43 is fixed to the body 42 by the use of, for example, special screws so that the cover 43 cannot be arbitrarily demounted from the case body 42 by the user or a third person who uses the HDD unit 30.

Accordingly, the HDD 31 housed inside the case 32 cannot be demounted or exposed outside the case 32 so as to prevent the HDD 31 from being unexpectedly damaged.

The bracket 33 fixing the HDD 31 to the case 32 is made of a metallic material such as an aluminum alloy having a high thermal conductivity.

As shown in FIG. 9, the bracket 33 includes a heat releasing unit 50, and a pair of support plates 51a and 51b.

The heat releasing unit 50 has a flat rectangular plate shape and has a size corresponding to the HDD 31. The one support 51a is erected from one lateral edge of the heat releasing unit 50. The other support plate 51b is erected from the other lateral edge of the heat releasing unit 50. That is, the support plates 51a and 51b face each other in a width direction of the HDD 31.

The body 34 of the HDD 31 is interposed between the support plates 51a and 51b and is resiliently supported by the support plates 51a and 51b via a plurality of first rubber dampers 52. The print circuit board 38 of the HDD 31 is interposed between the body 34 of the HDD 31 and the heat releasing unit 50 of the bracket 33.

A thermal conductive member 53 is interposed between the print circuit board 38 and the heat releasing unit 50 of the bracket 33. Thermal conductive grease or gasoline or a flexible thermal conductive sheet may be used as the thermal conductive member 53. The thermal conductive member 53 enables a thermal connection between the heating circuit components 39 and the heat releasing unit 50 or between the print circuit board 38 and the heat releasing unit 50.

As a result, heats radiated from the spindle motor 37 and the circuit components 39 during the HDD 31 is operated are efficiently transferred to the heat releasing unit 50 of the bracket 33 via the thermal conductive member 53.

In other words, a gap hindering thermal conduction is excluded between the HDD 31 and the heat releasing unit 50 by the thermal conductive member 53.

As shown in FIG. 9, a couple of flange portions 55 are formed at distal ends of support plates 46a and the 46b of the bracket 33. Cylindrical second rubber dampers 56 are attached to the flange portions 55. The second rubber dampers 56 protrude toward the heat radiating unit 50 of the bracket 33 from the flange portion 55.

Fixing screws 57 are inserted into centers of the second rubber dampers 56. The fixing screws 57 penetrate the second rubber dampers 56 and fit in four seat portions 58 protruding from the heat radiating unit 50. According to this configuration, the second rubber dampers 56 are interposed between the flange portion 55 and the seat portions 58 so as to resiliently hold the bracket 33 and the HDD 31 in the case body 42.

Figure 10:
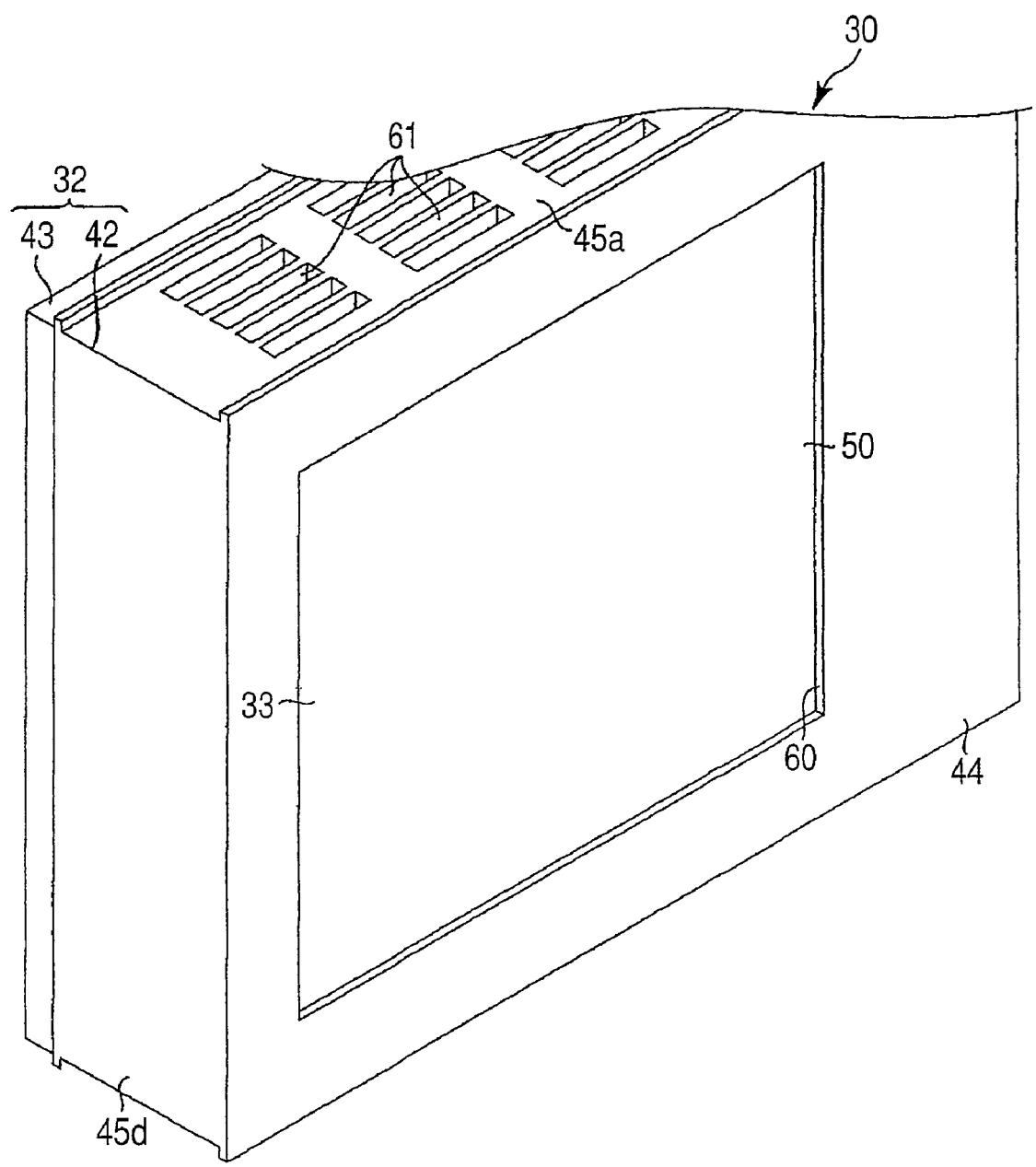
FIG. 10 is an exemplary perspective view of an HDD unit.

The heat releasing unit 50 of the bracket 33 is interposed between the HDD 31 and the bottom wall 44 of the case body 42 in a state where the bracket 33 is held in the case body 42. As shown in FIG. 10, a rectangular opening 60 facing the heat releasing unit 50 of the bracket 33 is formed on the bottom wall 44 of the case body 42. The opening 60 has a size corresponding to the heat releasing unit 50 of the bracket 33. The heat releasing unit 50 is directly exposed outside the case 32 through the opening 60.

A plurality of slit-shaped heat releasing holes 61 are formed on the peripheral wall 45*a* which is an upper surface of the case body 42 and the peripheral wall 45*c* which is a lower surface of the case body 42, respectively.

The HDD unit 30 in which the HDD 31 is housed inside the case 32 is removably inserted into the mounting hole 21 of the HDD holder 20 through the insertion hole 18 of the back cover 9 from a right side of the digital television broadcasting receiver 111.

At this time, the HDD 31 is held in the case 32 in a state where the print circuit board 38 faces the rear wall 10 of the back cover 9 as shown in FIG. 9. The case 32 of the HDD unit 30 is held in the HDD holder 20 in a state where the opening 60 faces the rear wall 10 of the back cover 9.

When the case 32 of the HDD unit 30 is inserted into the HDD holder 20, the second HDD connector 47 is fitted in the relay connector 26 of the HDD holder 20. The HDD 31 is electrically connected to a control circuit unit of the digital television broadcasting receiver 111 by the fitting.

As shown in FIG. 8, the opening 60 of the case 32 is located at the window portion 25 of the HDD holder 20 and the opening 46 is not covered by the HDD holder 20.

According to this configuration, the heat releasing unit 50 of the bracket 31, which receives the heat of the HDD 31, is exposed to the housing chamber 16 from the case 32 of the HDD 31 at an opposite side to the liquid crystal display panel 6 in a state where the HDD unit 30 is housed in the housing chamber 16 of the case 5.

The invention is not limited to the embodiments, but the constituent elements can be modified without departing from the gist of the invention at the time of putting the invention into practice. Various inventions may be made by proper combinations of a plurality of constituent elements of the embodiments. For example, some constituent elements may be removed from all the constituent elements of the embodiments. Constituent elements of other embodiments may be properly combined therewith. For example, a genre and a channel may be set by combining the first embodiment and the second As described with reference to the embodiment, there is provided a recording apparatus having a recording function on a removable recording medium, in which the video recording reservation can be also performed in a normal state after the recording medium is demounted by automatically mounting the recording medium in a recording apparatus having a recording function on an exchangeable recording medium even when a user forgets a mounting command on a recording medium for any reason after the recording medium is demounted by a user's demounting command with the intention of changing the recording medium, and a recording method.

What is claimed is:

1. A recording apparatus comprising:
   a removable recording medium;
   a processor;
   a receiving unit that receives an operation command for demounting the removable recording medium; and
   a display,
   wherein, when the receiving unit receives the operation command, the processor demounts the removable recording medium from a file system, and causes the display to present a reference time period; and
   wherein the processor automatically mounts the recording medium on the file system when a command of mounting the recording medium is not given for the reference time period after the recording medium has been demounted.

2. The recording apparatus according to claim 1, further comprising:
   a display; and
   a power source for the display,
   wherein the predetermined condition includes that the power source is turned off.

3. The recording apparatus according to claim 1, further comprising a nonoperation period detecting unit that detects a nonoperation period of the recording apparatus,
   wherein the predetermined condition includes that the nonoperation period lasts for a predetermined time.

4. The recording apparatus according to claim 1, further comprising: a timer recording unit that performs a timer recording operation on the recording medium,
   wherein the predetermined condition includes that a predetermined time that is before a start time of timer recording operation on the recording medium comes.

5. A recording method of a recording apparatus having a recording medium, a processor and a display, the recording method comprising: receiving a user's command of demounting the recording medium; demounting, by the processor, the recording medium from a file system in accordance with the user's command, and causing the display to present a reference time period; and automatically mounting, by the processor, the recording medium on the file system when a command of mounting the recording medium is not given for the reference time period after the recording medium has been demounted.

* * * * *

UNITED STATES PATENT AND TRADEMARK OFFICE
CERTIFICATE OF CORRECTION

PATENT NO. : 8,103,148 B2
APPLICATION NO. : 11/870727
DATED : January 24, 2012
INVENTOR(S) : Koji Miyazaki It is certified that error appears in the above-identified patent and that said Letters Patent is hereby corrected as shown below:

Title Page, please insert

--(30) Foreign Application Priority Data

April 11, 2007  (JP)    2007-103663--

Signed and Sealed this
Third Day of April, 2012

David J. Kappos
*Director of the United States Patent and Trademark Office*